Patented May 30, 1933

1,911,672

UNITED STATES PATENT OFFICE

WALTER BOCK AND EDUARD TSCHUNKUR, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ARTIFICIAL RUBBER

No Drawing. Application filed May 29, 1928, Serial No. 281,587, and in Germany June 10, 1927.

The present invention relates to the production of vulcanized artificial rubber goods of especially high quality.

In accordance with the invention artificial rubber-like masses, obtainable according to various polymerization processes from erythrene, isoprene, mono- and dimethyl-butadienes and other rubber forming diolefines, are intimately mixed in any desired manner, for instance by rolling, kneading and the like prior to vulcanization, with a most finely divided soot variety, such as lamp black and gas black, and then vulcanized in the customary manner with or without the usual additions, such as sulfur, accelerators, etc.

Besides the finely divided soot variety other fillers, such as alkaline-earth oxides or -carbonates, magnesium oxide, magnesium carbonate, zinc oxide, talcum kaolin, etc. may be applied simultaneously. The quantity of the soot variety to be added in the most finely divided state varies in very wide limits. It may be mentioned by way of example that generally quantities of more than 1%, calculated upon the rubber-like mass employed, will yield good results, but obviously it is also possible to use the finely divided soot varieties in any quantities with or without the addition of fillers in the normal state of division. Among the artificial rubber-like masses, especially such ones as are obtainable by polymerizing erythrene, isoprene, or 2.3-dimethylbutadiene, for instance in the presence of an alkali metal while heating, will yield satisfactory results.

Obviously the finely divided soot varieties may already be added to the rubber producing hydrocarbons above mentioned before the polymerization of the same, without departing from our invention.

When working according to the process herein described, artificial rubber-like vulcanizates are obtained of a quality, which so far has been unobtainable in synthetic rubber by any other means and which is proportionately greater than in the case of natural rubber.

Thus, for example, soft vulcanizates whose index of strength (that is, the product of the tensile strength in kilograms per square centimeter and of the stretch in per cent) amounts to between about 40,000 to about 150,000 will easily be obtainable, whereas in the absence of a finely divided soot variety vulcanizates having an index of strength of about 10,000 to 20,000 will be the normal ones.

The following examples illustrate our invention without limiting it thereto:

*Example 1.*—20 parts by weight of gas black, 3.15 parts by weight of sulfur, 9.4 parts by weight of zinc oxide and 1 part by weight of diphenylguanidine are rolled into 78 parts by weight of dimethylbutadiene rubber (methyl rubber) and the mixture is vulcanized at 143° C. for 50 minutes. The strength of the vulcanization product thus obtained as well as other constants, (the product of the tensile strength in kilograms per square centimetre and the stretch) are about 100% or more higher than in the case of the vulcanization products of the same mixture, vulcanized under otherwise identical conditions in the absence of gas black. The durability of the rubber articles thus prepared is accordingly very considerably increased.

The proportions of the mixture given in the above example can be varied within wide limits, likewise instead of zinc oxide other additions, plastifying media, substances for increasing elasticity or fillers can be used.

The temperature and duration of the vulcanization can be correspondingly varied within wide limits depending on the character of the vulcanization accelerator.

*Example 2.*—100 parts by weight of erythrene or isoprene are shaken with a solution of 4 parts by weight of egg albumen in 50 parts by weight of water with the addition of 15 parts by weight of finely divided lamp black at 60–70° C. until polymerization is complete. The vulcanization products of the rubber thus prepared show much higher strength and toughness, than those obtained without the addition of lamp black.

*Example 3.*—0.7 parts by weight of sulfur, 0.07 parts by weight of the piperidine salt of piperidyldithiocarbamic acid are rolled into 17 parts by weight of erythrene polymerizate (obtained by polymerization of erythrene in the presence of sodium metal). Now 8 parts by weight of gas black are intimately mixed in any desired manner with this mass and the whole is then vulcanized according to one of the known methods. The vulcanizate thus obtainable shows a tensile strength of about 130–150 kg. per square centimetre at a stretch of about 600–800%, whereas when working in the same manner but without the addition of gas black a vulcanization product is obtained which shows a tensile strength of about 30–40 kg. per square centimetre at a stretch of about 700–1100%.

A vulcanizate of other properties is obtained when using the same ingredients but in another sequence, for instance when rolling the sulfur, the accelerator and the gas black into the erythrene polymerizate simultaneously, and it is to be understood that in the most cases the sequence of the addition of the fillers, accelerators etc. changes the properties of the resulting vulcanizates in a certain degree.

*Example 4.*—0.7 parts by weight of sulfur, 0.07 parts by weight of the piperidine salt of piperidyldithiocarbamic acid, 3 parts by weight of most finely divided magnesium carbonate and 6 parts by weight of finely divided lamp black are rolled into 17 parts by weight of erythrene polymerizate (obtained as described in Example 3) and the mass is vulcanized in a suitable manner. The quality of the vulcanizate thus obtainable is still higher than those of the vulcanizates described in Example 3.

We claim:

1. As new products soft, rubber-like vulcanizates consisting of a vulcanized diolefine polymerizate and a finely divided soot variety, said vulcanizates possessing an index of strength between about 40,000 and 150,000.

2. As new products soft, rubber-like vulcanizates consisting of a vulcanized diolefine polymerizate and gas black, said vulcanizates possessing an index of strength between about 40,000 and 150,000.

3. As new products soft, rubber-like vulcanizates consisting of a vulcanized polymerizate derived from a diolefine hydrocarbon of the formula:

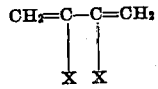

wherein the X's means hydrogen or methyl, and a finely divided soot variety, said vulcanizates possessing an index of strength between about 40,000 and 150,000.

4. As new products soft, rubber-like vulcanizates consisting of a vulcanized polymerizate derived from a diolefine hydrocarbon of the formula:

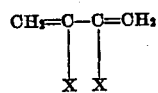

wherein the X's mean hydrogen or methyl, and gas black, said vulcanizates possessing an index of strength between about 40,000 and 150,000.

5. As new products soft, rubber-like vulcanizates consisting of a vulcanized polymerizate, obtained by polymerizing butadiene in the presence of an alkali metal and vulcanizing the polymerizate in the presence of a finely divided soot variety, said vulcanizates possessing an index of strength between about 40,000 and 150,000.

6. As new products soft, rubber-like vulcanizates consisting of a vulcanized diolefine polymerizate and from about 15% to about 50% of a finely divided soot variety, based on the amount of the vulcanizate, said vulcanizates possessing an index of strength between about 40,000 and 150,000.

7. As new products soft, rubber-like vulcanizates consisting of vulcanized isoprene polymerizate and a finely divided soot variety, said vulcanizates possessing an index of strength between about 40,000 and 150,000.

8. As new products soft, rubber-like vulcanizates consisting of vulcanized polymerizate obtained by polymerizing butadiene in the presence of sodium and vulcanizing the polymerizate in the presence of a finely divided soot variety, said vulcanizates possessing an index of strength between about 40,000 and 150,000.

9. As new products soft, rubber-like vulcanizates consisting of vulcanized polymerizates obtained by polymerizing a diolefine hydrocarbon of the formula:

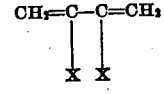

wherein the X's mean hydrogen or methyl, in emulsion with water and an emulsifying agent, in the presence of a finely divided soot variety, said vulcanizates possessing an index of strength between about 40,000 and 150,000.

In testimony whereof we have hereunto set our hands.

WALTER BOCK.
EDUARD TSCHUNKUR.